United States Patent
Vischulis et al.

[15] 3,635,240
[45] Jan. 18, 1972

[54] ELECTROPNEUMATIC TRANSDUCER AND PNEUMATIC WEB TENSIONING SYSTEM

[72] Inventors: George Vischulis, Menomonee Falls; Charles K. Sedlak, Wauwatosa, both of Wis.

[73] Assignee: Zerand Corporation, New Berlin, Wis.

[22] Filed: Nov. 21, 1969

[21] Appl. No.: 878,691

[52] U.S. Cl. ............................................ 137/495, 251/129
[51] Int. Cl. ..................................................... G05d 15/01
[58] Field of Search ............ 137/495, 505.3, 505.35, 505.36, 137/407.5, 454.6, 487.5; 251/130, 138, 282, 129; 308/6 B; 242/75.42

[56] References Cited

UNITED STATES PATENTS

| | | | |
|---|---|---|---|
| 2,650,607 | 9/1953 | Bryant | 137/501 X |
| 2,826,215 | 3/1958 | Wolfslav et al. | 251/282 X |
| 2,832,330 | 4/1958 | Hughes | 308/6-B X |
| 2,833,303 | 5/1958 | Levtwiler et al. | 137/495 |
| 3,001,535 | 9/1961 | Mueller | 137/495 X |
| 3,006,571 | 10/1961 | Vischulis | 242/75.42 |
| 3,177,958 | 4/1965 | Link | 308/6-B X |
| 3,179,123 | 4/1965 | Kowalski et al. | 137/495 |
| 3,482,816 | 12/1969 | Arnold | 251/129 X |

*Primary Examiner*—M. Cary Nelson
*Assistant Examiner*—Robert J. Miller
*Attorney*—James E. Nilles

[57] ABSTRACT

An electropneumatic transducer having a pneumatic pressure regulator operatively controlled by a solenoid, an adjustable spring biasing assembly connected to the regulator and solenoid to maintain the moving parts of the transducer in a normally closed position and to minimize vibratory motion induced in the moving parts. A diaphragm arrangement is connected to respond to the output pressure of the regulator to introduce an additional force to the force of the solenoid. The inherent friction of the solenoid is reduced by a linear bearing arrangement. A pneumatic web tensioning system utilizing such an electropneumatic transducer.

11 Claims, 2 Drawing Figures

PATENTED JAN 18 1972
3,635,240
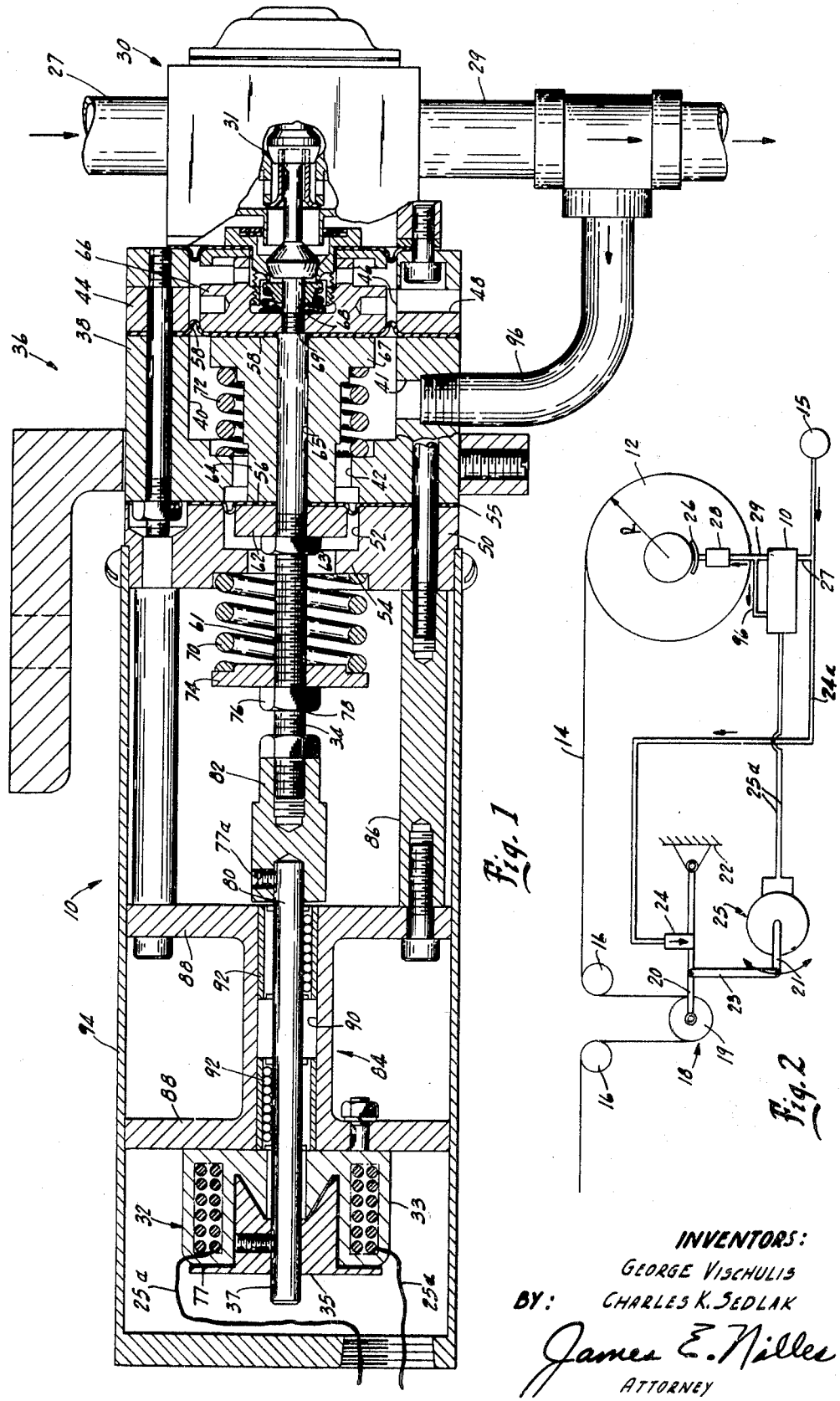
INVENTORS:
GEORGE VISCHULIS
CHARLES K. SEDLAK
BY: James E. Nilles
ATTORNEY

ELECTROPNEUMATIC TRANSDUCER AND PNEUMATIC WEB TENSIONING SYSTEM

BACKGROUND OF THE INVENTION

Electropneumatic transducers are designed to respond to a remote electric signal to control the air pressure to a device being operated. These transducers are designed to provide accurate control at maximum pressure or operating conditions and are generally not as accurate at the low operating pressures of the regulator and are generally slow responding. Precise operation through the full operating range of the pressure regulator is often achieved by using a large and expensive solenoid to control the regulator. In many applications, it is not only desirable to obtain precise pressure control at all operating pressures but it is also necessary to do so at low cost. This is particularly significant in a web tensioning system where accuracy and rate of response are essential to maintain control of the web tension.

An example of the prior art type of a direct operated transducer is shown in the U.S. Pat. No. 3,006,571, which issued on Oct. 31, 1961 to George Vischulis, one of the inventors in the present application. While that transducer did operate entirely satisfactorily for its particular purpose, it did not provide sufficient flexibility as to a variety of installations.

SUMMARY OF THE INVENTION

The electropneumatic transducer of the present invention provides precise pressure control over the full range of operating pressures of a pressure regulator using a small low-cost solenoid. This is achieved by using a pair of counteracting springs to maintain the moving parts of the transducer in a stable condition.

As the magnetic gap of the solenoid is changed, and with a constant current in the coil, the thrust force changes. This has the effect on the regulator mechanical system of a negative spring rate. The springs used in the transducer have a combined, effective spring rate greater than this "negative" rate of the solenoid and the system is therefore stable, the totalized spring rate (solenoid negative plus springs positive) is and should be a positive rate.

As output pressure increases in the regulator, a power assist force is added to the force of the solenoid by a pressure responsive diaphragm arrangement connected to respond to the output pressure of the regulator. The motion of the solenoid is limited to a linear movement to reduce friction and substantially eliminate hysteresis.

A pneumatic web tensioning system utilizing a pneumatic transducer is particularly responsive, sensitive and efficient in performing the function for which it is intended.

These and other objects and advantages of the present invention will appear hereinafter as this disclosure progresses, reference being had to the accompanying drawings.

BRIEF DESCRIPTION OF THE DRAWINGS

FIG. 1 is a sectional view of the electropneumatic transducer; and

FIG. 2 is a schematic view of a web tensioning system using the transducer of this invention.

DESCRIPTION OF A PREFERRED EMBODIMENT

The electropneumatic transducer 10 of this invention finds particular, but not exclusive, utility in controlling the pressure required to operate a pneumatic web tensioning system. The transducer 10 is shown (FIG. 2) in combination with a typical web tensioning system which includes a web roll 12 of flexible material having a running web 14 threaded around a pair of idler rolls 16 and a dancer 18. The dancer 18 includes an idler roll 19 mounted on a pair of arms 20 which are pivotally connected to a fixed bracket 22 and biased by an air cylinder 24 to establish the tension in the web 14. Air pressure is supplied to cylinder 24 via conduit 24a from the pressure source 15. The amount of tension in the running web 14 can be determined by the angular position of the dancer arms 20 relative to the fixed bracket 22. As this angular position changes, a signal device, such as a potentiometer 25 having an arm 21 connected to the arm 20 by a link 23, is used to provide an electric signal via wires 25a to the transducer 10.

The tension on the running web 14 is initially set by means of a friction break employed 26 operated by a brake cylinder 28 which is used to apply a retarding force to the rotational movement of the roll 12. The friction force of the brake 26 must be constantly changed in order to maintain a constant tension at the periphery of the roll as the radius "r" of the roll decreases. The potentiometer 25 transmits a continuous signal to the transducer 10 which must respond quickly and accurately to the signal to control the air pressure from a source 15 to the brake cylinder 28 to maintain a constant tension in the web.

The transducer 10 of this invention provides precise control of the brake 26 by automatically adding a power assist force to the force of the solenoid corresponding to the output pressure of the regulator, maintaining the moving parts of the transducer centered and reducing the movement of the solenoid to substantially eliminate hysteresis. More particularly the transducer 10 generally includes a pressure regulator 30 and a solenoid 32 connected to the pressure regulator 30 by a shaft 34. Although the pressure regulator 30 shown is a conventional force balanced regulator made by Governaire of Winston-Salem North Carolina, model No. 1062-0-150 p.s.i., any other type of force balanced regulator could be used. The regulator 30 has an inlet 27 connected to the pressure source 15 and an outlet 29 connected to the brake cylinder 28. The flow of air through the regulator 30 is controlled by a valve 31 which requires a small force to operate at low-operating pressure and a gradually increasing force up to the maximum output pressure of the regulator.

The solenoid 32 is also a conventional solenoid made by Ledex, of Dayton, Ohio, No. 129415-030 which has an operating force of 0-20 pounds. The solenoid has a core 33 and an armature 35 connected to a plunger 37. The solenoid 32 responds to the electrical signal from the potentiometer 25 to move the armature 34 toward the core 33 and thereby apply a force to the shaft 34 to open the valve 31 in the pressure regulator 30 as more fully described below. As the signal from the potentiometer 25 increases due to an increase in the angular deviation of the dancer arm 20, the electrical signal will increase and the force applied to the shaft 34 by solenoid 32 will also increase.

In accordance with one aspect of the invention, means are provided for adding a power assist force to the solenoid in proportion to the increase in the outlet pressure. Such means includes a housing 36 formed from a spacer block 38 having a central aperture 40, a port 41 and a radially inwardly directed flange 42; a mounting plate 44 having a central opening 46 and a port 48; and a spacer plate 50 having a central opening 52 and a radially inwardly directed flange 54.

The space within the spacer block 38 is enclosed by means of a pair of diaphragms 56 and 58. The outer edge of the small diaphragm 56 is clamped between the spacer plate 50 and the spacer block 38. A spacer ring 55 is positioned between the outer edges of the spacer plate 50 and spacer block 38 to prevent the edge of the diaphragm 56 from being squeezed out of the space between the plate 50 and the spacer block 38. The large diaphragm 58 is clamped between the spacer block 38 and mounting plate 44.

Means are provided for connecting the diaphragms 56 and 58 to the shaft 34. Such means is in the form of a shaft block 64 having a central aperture 65 and a radial flange 67 mounted on the shaft 34 between the diaphragms 56 and 58. The diaphragm 56 is clamped to the shaft block 64 by means of a washer 62 and a nut 63 mounted on a threaded portion 61 of the shaft 34. The diaphragm 58 is clamped to the shaft block 64 by means of a plate 66 having a threaded aperture 69 to receive the threaded end 68 of the shaft 34.

The output pressure of the regulator 30 is fed back to the space within the spacer block 38 between the diaphragms 56 and 58 by a bypass conduit 96 connected to the output conduit 27 and the port 41. Since diaphragm 58 is larger than diaphragm 56, the resulting force will be added to the force of the solenoid.

In this particular arrangement, the small diaphragm has an actual cross-sectional area of 0.83 inches and the larger diaphragm has an actual cross-sectional area of 2.15 inches, the resulting area being 1.32 square inches. As the output pressure of the regulator increases from 0 up to a maximum of approximately 30 p.s.i., the resulting force of the diaphragms will increase linearly from 0 up to approximately 40 pounds of force. This force is added to the force of the solenoid, making it possible to operate the regulator.

The solenoid 32 and valve 30 of the transducer 10 are initially preset by means of a pair of stiff springs 70 and 72 to maintain stability in the movement of the transducer. The spring 70 is positioned between the flange 54 on the mounting plate 50 and a spring plate 74 provided on the shaft 34. Means are provided for adjusting the force of the spring 70 by varying the distance of the plate 74 from the mounting plate 50. Such means is in the form of a nut 76 mounted on the threaded section 61 of the shaft 34. The spring 72 is positioned between the flange 42 on the spacer block 38 and the radially outwardly directed flange 67 on the shaft block 64. The springs 70 and 72 are mounted on the shaft 34 in opposition to each other. By adjusting the position of the plate 74 on the shaft 34, the resulting force of the springs can be set to substantially equal the force required to open the valve 31 at zero output pressure of the regulator. The springs 70 and 72 are also provided with parallel bases to eliminate any side forces being introduced into the motion of the shaft 34.

The spring rate of the springs must be stiff enough to maintain stability at the natural frequency contemplated for the device being controlled. For example, in a web tensioning system, the tension of the web 14 will vary cyclically in each revolution of roll 12 because the roll 12 is not always round. In this particular embodiment, each of the springs 70 and 72 has a spring rate of 250 pounds per inch.

As the magnetic gap 77 of the solenoid is changed, and with a constant current in the coil, the thrust force changes. This has the effect on the regulator mechanical system of a negative spring rate. The springs 70 and 72 in the transducer have a combined, effective spring rate greater than this "negative" rate of the solenoid and the system is therefore stable, the totalized spring rate (solenoid negative plus springs positive) is and should be a positive rate.

The airgap can be adjusted by set screw 77a by means of which the length of the central shaft can be changed.

Means are provided for reducing friction, particularly break away friction, to substantially eliminate hysteresis in the movement of the solenoid. Such means is in the form of a pair of linear ball bearings 92. More particularly, the solenoid 32 is mounted on a bearing housing 84 which is secured to the mounting plate 50 by a number of posts 86. The bearing housing 84 has a radial flange 88 at each end and a central aperture 90. The plunger 37 of the solenoid extends through the aperture 90 and is connected to the shaft 34 by means of a connecting link 82. The motion of the plunger 37 is limited to linear movement by means of the pair of linear ball bearings 92 positioned in a spaced relation in the aperture 90 of the bearing housing 84. The ball bearings 92 reduce friction to a minimum so that the solenoid can quickly respond to small electric signals and operate the regulator at low pressures of 0 to 2 p.s.i. The solenoid 32 is enclosed by means of a cylindrical housing 94 secured to the mounting plate 50.

RESUME

By means of the present invention, an electropneumatic transducer is provided having accurate pressure control at both high- and low-output pressures of a pressure regulator. A small solenoid having a low-operating force can be used to operate the transducer since a linearly increasing power assist force proportional to the output pressure of the regulator is automatically added to the force of the solenoid as the output pressure of the regulator increases: Hysteresis in the movement of the solenoid has been practically eliminated in the movement of the solenoid by eliminating friction. The cost of the transducer is substantially reduced by using the low force solenoid to provide precise pressure control. A web tensioning system is also provided having accurate web tensioning control utilizing this transducer. In this type of a system, quick response to a control signal is essential to maintain accurate web tension.

We claim:

1. An electropneumatic transducer comprising, a pressure-regulating valve having an inlet and an outlet, a solenoid operatively connected to said valve to control the flow of air through said valve, spring means connected with and for maintaining the moving parts of said solenoid and said pressure-regulating valve in a normally closed stable position, and means for applying an operating force to said valve other than the force of said solenoid in response to an increase in the output pressure of said valve.

2. An electropneumatic transducer according to claim 1 wherein said maintaining means includes a pair of opposing springs having substantially the same spring rate.

3. An electropneumatic transducer according to claim 2 wherein the spring rate of said springs has a natural frequency higher than the contemplated frequency of operation of said solenoid.

4. An electropneumatic transducer according to claim 1 including means for reducing friction in the movement of said solenoid.

5. An electropneumatic transducer according to claim 4 wherein said friction reducing means comprises a pair of linear ball bearings.

6. An electropneumatic transducer comprising, a pressure-regulating valve having an inlet and an outlet, a solenoid connected to open said valve to control the flow of air through said valve, and means for applying an operating force to said valve other than the force of said solenoid in response to the increase of the output pressure in said valve, said force applying means including a pair of diaphragms of different diameter connected to said valve and being responsive to the output pressure of said regulating valve to provide a force which increases directly with an increase in output pressure.

7. An electropneumatic transducer according to claim 6 including means connected to said pressure-regulating valve and said solenoid for maintaining the moving parts of said transducer in a stable condition.

8. An electropneumatic transducer connected to respond to a remote electric control signal to control the operation of a pressure responsive device, said transducer comprising, a pressure regulator having an inlet connected to a source of high-pressure air, an outlet connected to said device and a normally closed valve to control the flow of air from said inlet to said outlet, a solenoid connected to respond to said signal and connected to open said valve, counteracting spring means connected to said solenoid for presetting said solenoid and said valve in a normally closed position and for eliminating vibratory motions in said valve, and means connected to said solenoid for applying an operating force to said valve other than the force of said solenoid in response to an increase in the outlet pressure of said valve.

9. A transducer according to claim 8 wherein said force applying means includes a pressure responsive diaphragm connected to said solenoid to provide a force to said solenoid proportional to the outlet pressure of said valve.

10. A transducer according to claim 8 wherein said spring means includes a pair of opposing springs connected to said solenoid.

11. A transducer according to claim 10 including means for adjusting the force of one of said springs to preset the force required to operate the regulator at zero output pressure.